(12) United States Patent
Henly

(10) Patent No.: US 7,207,288 B2
(45) Date of Patent: Apr. 24, 2007

(54) FIXING ASSEMBLIES AND METHODS

(75) Inventor: Nicholas Charles Henly, Hampshire (GB)

(73) Assignee: Lewmar Limited, Hampshire (GB)

( * ) Notice: Subject to any disclaimer, the term of this patent is extended or adjusted under 35 U.S.C. 154(b) by 89 days.

(21) Appl. No.: 10/815,678

(22) Filed: Apr. 2, 2004

(65) Prior Publication Data
US 2004/0228702 A1 Nov. 18, 2004

(30) Foreign Application Priority Data
May 1, 2003 (GB) ................. 0310073.2

(51) Int. Cl.
- B63B 21/04 (2006.01)
- F16B 39/10 (2006.01)
- F16B 39/24 (2006.01)
- B66D 1/00 (2006.01)

(52) U.S. Cl. ................. 114/343; 411/81; 411/134

(58) Field of Classification Search .......... 114/218, 114/343, 364; 411/1–7, 81, 132–135
See application file for complete search history.

(56) References Cited

U.S. PATENT DOCUMENTS

| 4,291,864 | A | * | 9/1981 | Reynolds | ........... 254/375 |
|---|---|---|---|---|---|
| 4,621,961 | A | | 11/1986 | Gulistan | |
| 4,753,560 | A | * | 6/1988 | Ryder | ............ 411/82 |
| 5,779,409 | A | * | 7/1998 | Manzolli | ............ 411/7 |
| 5,967,723 | A | | 10/1999 | Duran | |
| 6,287,063 | B1 | | 9/2001 | Moller | |

FOREIGN PATENT DOCUMENTS

| DE | 3210147 A1 | 11/1982 |
|---|---|---|
| DE | 299 09 332 | 8/1999 |
| FR | 2 574 877 | 6/1986 |
| GB | 395321 | 10/1931 |
| GB | 913272 | 9/1960 |
| GB | 2354807 A | 4/2001 |

OTHER PUBLICATIONS

Lewmar Limited, "Winch Parts Manual", vol. 9, pp. 1-26, United Kingdom, 2000.

* cited by examiner

Primary Examiner—Ajay Vasudeva
(74) Attorney, Agent, or Firm—Buchanan Ingersoll & Rooney PC

(57) ABSTRACT

Disclosed is an assembly for assisting in the attachment of an appliance such as a winch to a surface (e.g. deck) of a watercraft such as a sailing boat. Fixing screws are retained in apertures in the winch by retaining means such as lock washers. The assembly of the winch and screws may therefore be produced at a location remote from the watercraft, the retaining means holding the screws against rotation during transportation and during fixing of the appliance to the surface of the watercraft.

14 Claims, 2 Drawing Sheets

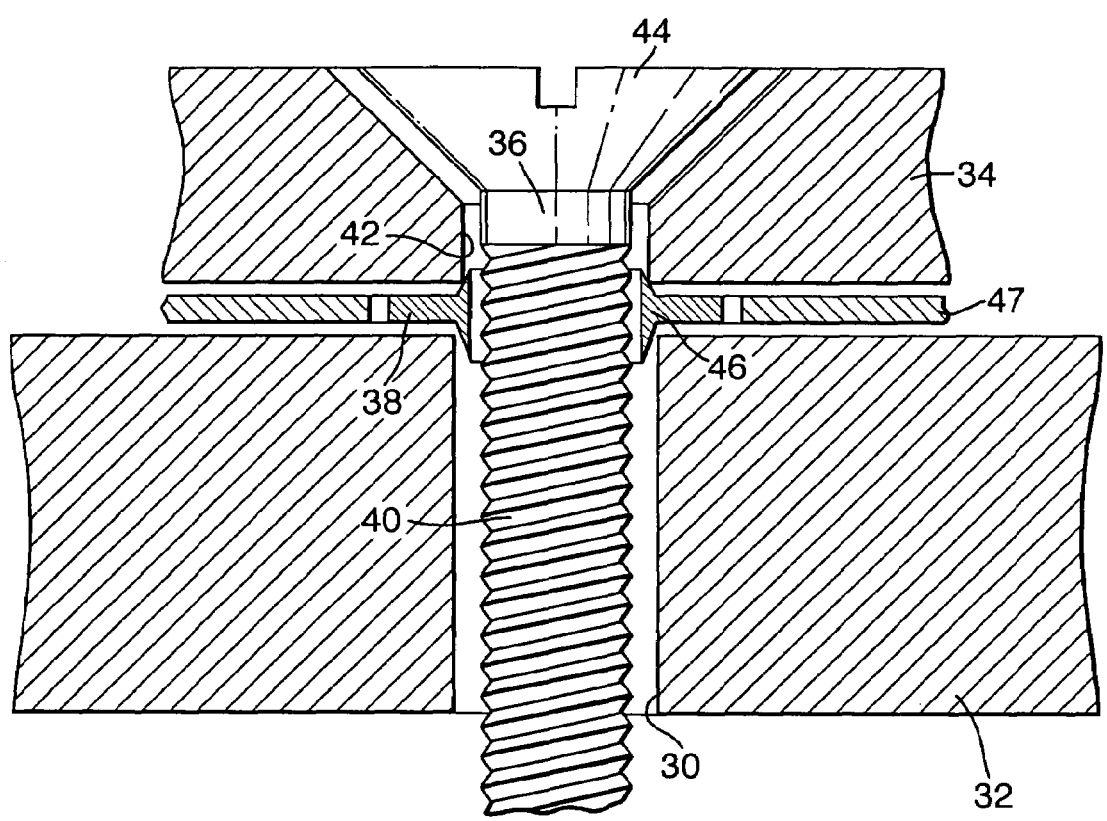

FIXING ASSEMBLIES AND METHODS

FIELD OF THE INVENTION

The present invention relates to the attachment of an appliance such as a winch to a surface of a vessel, such as the deck of a yacht.

BACKGROUND OF THE INVENTION

Yacht winches are usually fixed to the deck of yachts using screws which extend through holes in the base plate of the winch though corresponding holes drilled in the yacht deck. The screws are then fastened at the underside of the deck using washers and nuts.

To thread the screws through the holes on the base plate, the winch must first be partially disassembled. Usually, the top cap of the winch must be removed and the winch drum taken off to expose the holes in the base plate. After applying waterproof sealing material to the underside of the base, the winch base plate is attached to the yacht deck by placing countersink screws through the holes in the base plate and the holes in the deck. Two operators are required for this fastening operation. One is above deck to hold the screw heads stationary. One is below deck to attach the washers and nuts to tighten the base plate to the deck. Then, the drum and top cap are reassembled onto the winch. Any excess sealing material is then cleaned off the edges of the base plate.

SUMMARY OF THE INVENTION

The inventor has realized that this approach to fixing a winch to a deck is disadvantageously labor intensive and difficult. By the present invention, the inventor has addressed these problems by holding each screw with respect to the winch using a retaining element. Advantageously, the screw may then be fitted to the winch during manufacture of the winch itself. This avoids the need for disassembling the winch during the process of fixing the winch to the deck.

The inventor has also realized that the inventive concept also has broad applicability to appliances other than winches. Accordingly, in a general aspect, the present invention provides, for an appliance for attachment to a surface of a vessel, a retaining element for retaining a fastening element in place with respect to the appliance.

The retaining element and the fastening element may be applied to the appliance, for example, during manufacture of the appliance. Alternatively, they may be applied in a separate step to the manufacture of the appliance but also in a separate step to attaching the appliance to the surface of the vessel. This has the advantage of making the attachment of the appliance to the surface of the vessel more straightforward because the appliance need not be dismantled for the attachment step. Furthermore, retaining the fastening element in place with respect to the appliance can assist during the attachment step by holding the fastening element with respect to complementary fastening means.

In a first aspect, the present invention provides an assembly of: a watercraft appliance;
one or more threaded fastening elements; and
one or more retaining elements, wherein the appliance is for attachment to a surface of a watercraft using said threaded fastening elements in combination with one or more cooperating elements threadable on said threaded fastening elements, and wherein the appliance has one or more apertures, each said threaded fastening element being retained in a respective one of said apertures and being held against rotation with respect to the appliance up to a threshold torque by a respective one of said retaining elements, thereby allowing rotation of said threaded fastening element at torques higher than the threshold torque.

In a second aspect, the present invention provides a method of attaching an appliance to a surface of a watercraft using one or more fastening elements, including providing an assembly of:
a watercraft appliance;
one or more threaded fastening elements; and
one or more retaining elements, wherein the appliance has one or more apertures, each said threaded fastening element being retained in a respective one of said apertures and being held against rotation with respect to the appliance up to a threshold torque by a respective one of said retaining elements, the method further including the step of fastening the appliance to the surface of the watercraft by threading and tightening cooperating elements onto said threaded fastening elements using a torque lower than the threshold torque, each fastening element being retained in place with respect to the appliance by its respective retaining element before and during attachment of the appliance.

In a third aspect, the present invention provides the use of a retaining element to retain a fastening element in place with respect to an appliance in an assembly according to the first aspect.

In a fourth aspect, the present invention provides a method of producing an assembly of: a watercraft appliance;
one or more threaded fastening elements; and
one or more retaining elements, wherein the appliance has one or more apertures, the method including retaining each said threaded fastening element in a respective one of said apertures and holding said fastening elements against rotation with respect to the appliance up to a threshold torque using a respective one of said retaining elements.

The following preferred and/or optional features are applicable to any of the general, the first, second, third and/or fourth aspects, unless specifically indicated. Preferred and/or optional features may be combined in any combination.

Preferably, the step of attaching the appliance to the surface of the vessel is not part of the method of producing the assembly. For example, the method of producing the assembly may take place in a different geographical location to the step of attaching the appliance to the vessel, such as in a different factory or on a different production line.

The invention is of particular interest for vessels such as sailing boats, sailing yachts and other water-borne craft.

The appliance is preferably a winch. However, it may be other equipment which requires attachment to the surface (e.g. deck) of the vessel. For example, the appliance may be a windlass, rope clutch, cleat, track, pad eye, fuel/filler cap, rail, etc., or other deck fitting.

The threaded fastening element may be a screw or bolt. In that case, the complementary fastening means used in combination with the fastening element to hold the appliance with respect to the surface is usually a nut and optional washer.

Typically, the retaining element remains in place even after attachment of the appliance to the surface. However, its function of retaining the fastening element with respect to the appliance is taken over by the complementary fastening means. In a sense, therefore, the retaining function of retaining element is preferably a temporary retaining function. The retaining function preferably extends from the production of the assembly to the attachment of the assembly to the surface of the vessel.

Preferably, the attachment of the appliance to the surface of the vessel does not require disassembly of the appliance, for example the removal of the fastening elements from holes in the appliance in which they are located for fixing the appliance to the deck. Thus, the fastening elements are preferably accessible by operators without disassembly of the appliance. This allows the appliance to be attached to the surface of the vessel more easily.

The combination of the fastening element and the complementary fastening means typically holds the appliance with respect to the surface of the vessel by cooperation with corresponding holes in the surface. Similarly, there may be corresponding holes in the appliance. The retaining element may hold the fastening element with respect to the appliance by frictional engagement with the fastening element and/or a hole in the appliance.

Most preferably, the retaining element is a lock washer. However, it will be understood that the retaining element can take other forms, such as a suitably sized O-ring. Typically, the retaining element is located on a shaft of the fastening element, abutted at the opposite side of a hole on the appliance to a head of the fastening element.

Preferably, the retaining element substantially prevents translational movement of the fastening element along the axis of the hole in the appliance.

The temporary nature of the function of the retaining element may dictate that movement of the fastening element with respect to the appliance may not be prevented at high torques (e.g. above the threshold torque). However, it is intended that the retaining element can prevent movement of the fastening element with respect to the appliance at the order of torques and loads that can be expected to be applied to the fastening element (either purposefully or accidentally) during manufacture and/or transport of the assembly of the appliance and fastening element.

It is intended that the retaining element substantially prevents movement of the fastening element with respect to the appliance during mounting of the cooperating elements (e.g. nut) to the fastening element.

The retaining element may have an engagement portion. For example, such an engagement portion may be provided to protrude into the hole in the appliance. Preferably, the engagement portion provides additional securing of the fastening element with respect to the appliance by being jammed between the fastening element and the hole in the appliance. Thus, the engagement portion may be an annular projection from the retaining element, extending substantially parallel to the axis of the fastening element. The retaining element may have a complementary engagement portion arranged to protrude into preferably be jammed in) the hole in the deck to which the appliance is to be fixed. The complementary engaging portion may have a similar form to the engagement portion described above. The advantage provided by the engagement portion is the improved securing of the fastening element with respect to the appliance compared to a retaining element of, for example, toroidal shape with no engagement portion, such as an O-ring.

Preferably, a sealing element is located between the appliance and the surface of the vessel. A seal is required in order to avoid ingress of water into the vessel from the surface. In the past, a sealing fluid, paste or gel composition has been applied between the appliance and the surface. This is messy and requires cleaning of the edges of the appliance after attachment. The use of a sealing element such as a gasket avoids the need for this cleaning step.

Each hole in the appliance for attaching the appliance to the vessel may have a corresponding sealing element. For example, in the case of the use of a gasket as the sealing element, a gasket may be provided around each such hole, located in sealing engagement between the appliance and the surface. Alternatively, one gasket may provide sealing for more than one hole in the appliance. For example, a single gasket might be provided which has corresponding openings for two, more or all of the fastening holes in the appliance, thereby providing sealing for those holes.

Alternatively, the retaining element may function as the sealing element. In that case, in the assembly of the appliance and fastening element, before attachment to the vessel, at least part (for example, the complementary engagement portion) of the retaining element may project from the base of the appliance. The retaining element, or at least this projecting part of it, may then be compressed between the base of the appliance and the surface of the vessel under the load applied by the attachment of the appliance to the vessel. Preferably, therefore, the retaining element is formed of a resilient material such as a hard rubber or plastics material. An additional sealing element (such as a gasket) and/or sealant may be used in combination with the sealing retaining element.

In another preferred aspect, the invention provides an assembly of a winch, preferably a yacht winch, and screws for attaching the winch to a deck, wherein each screw is retained in a respective attachment hole of the winch by a lock washer.

In another preferred aspect, the invention provides the use of a lock washer to retain a screw in place in an attachment hole of a winch, preferably a yacht winch.

In another preferred aspect, the invention provides a method of attaching a winch, preferably a yacht winch, to a deck using screws, wherein an assembly of the winch and screws is provided, in which each screw is retained in a respective attachment hole of the winch by a lock washer.

In another preferred aspect, the invention provides a method of assembling a winch, preferably a yacht winch, prior to attachment to a deck, wherein screws are retained in attachment holes of the winch by lock washers.

Preferably, the attachment of the winch to the deck does not require disassembly of the winch.

The features of the above preferred aspects may be combined with any of the general, first, second, third and/or fourth aspects of the inventions and any preferred or optional feature thereof.

Other objects, features and advantages of the invention will become apparent from a consideration of the following detailed description and from the accompanying drawings.

BRIEF DESCRIPTION OF THE DRAWINGS

FIG. 2 shows an enlarged schematic cross-sectional view of a part of a winch, during attachment of the winch to a deck. The view is taken at a fixing hole in the deck.

DETAILED DESCRIPTION OF PREFERRED EMBODIMENTS

Figure 1:
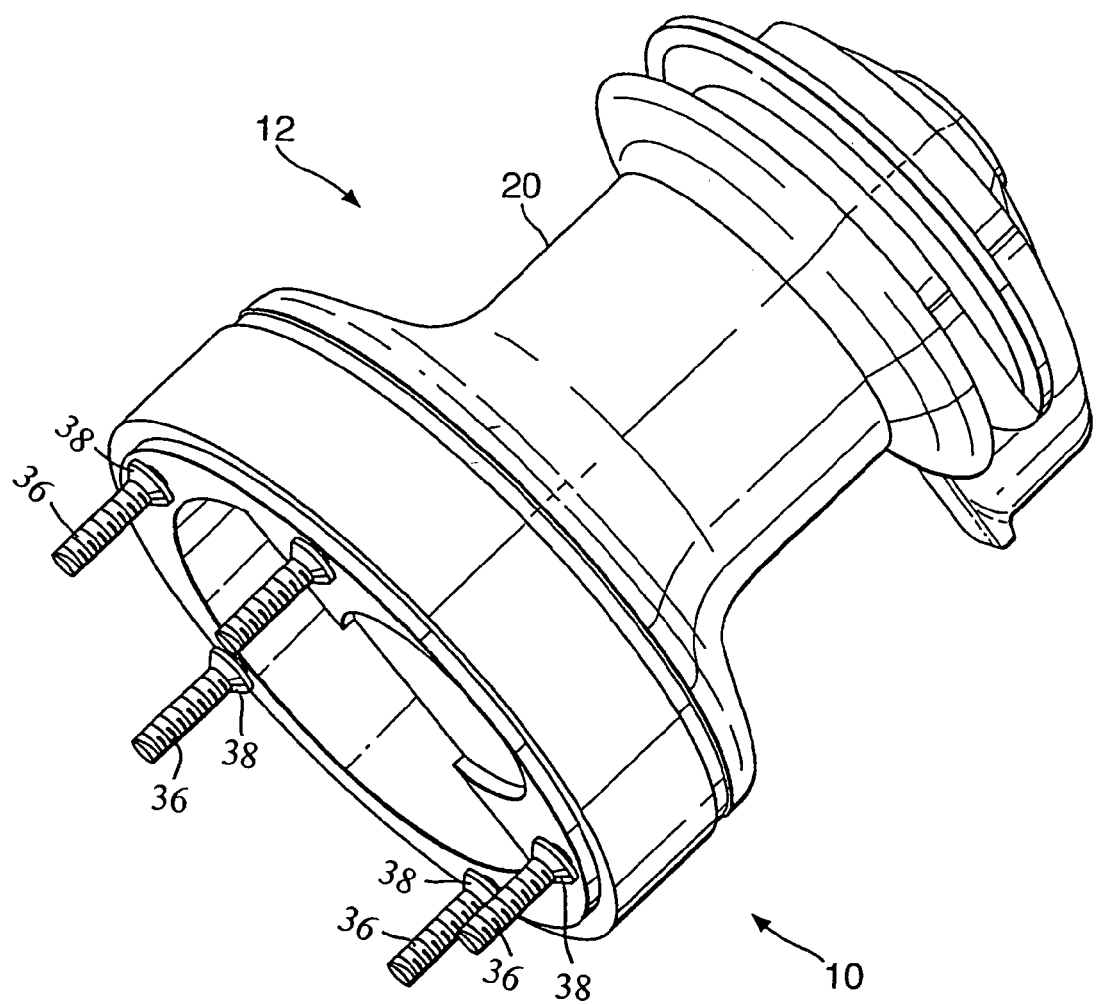
FIG. 1 shows a schematic perspective view of a winch assembly, including pre-located screws.

FIG. 1 shows a winch assembly 10 including a winch 12, fixing screws 36 and lock washers 38. The winch includes base plate 34, drum 20 and top cap (not shown). In the exemplary winch shown, there are five through-holes extending through the base plate for location of screws 36.

The assembly shown in FIG. 1 is produced as part of the winch production process. It is relatively straightforward, as part of that process, to incorporate screws 36 and lock washers 38 into the base plate 34 during manufacture of the winch. Thus, when the drum 20 and top plate are applied, the assembly is ready for transportation or shipping to the vessel to which it is to be attached.

Suitable winches for use in embodiments of the invention are well known. For example, Lewmar Limited of Southmoor Lane, Havant, Hampshire, PO9 1JJ, United Kingdom, produce suitable winches, such as one-speed winches (e.g. No. 6), two-speed winches (e.g. No. 30ST) and three-speed winches (e.g. No. 66ST).

FIG. 2 shows an enlarged sectional view through a fixing hole 30 drilled in a deck 32 (partially shown) of a winch base 34 (partially shown) being attached to deck 32. Fixing screw 36 is pre-located in an assembly of the winch by lock washer 38. In the assembly, lock washer 38 is in frictional engagement with the surface of the shaft 40 of fixing screw 36, although FIG. 2 shows the lock washer separate from surface of shaft 40 for clarity.

During production of the winch, screw 36 is located in hole 42 in base plate 34. Hole 42 is countersunk to cooperate with the shape of head 44 of screw 36. Then, lock washer 38 is applied to the shaft of the screw and abutted against the lower surface of base plate 34. The frictional engagement between screw shaft 40 and lock washer 38 is such that the screw is not moved with respect to hole 42 during further production of the winch assembly. For example, the screw will not move under gravity, nor will it move during shipping, nor will it move during accidental light loading of the screw.

As shown in FIG. 2, the lock washer includes engagement portion 46. This is an annular, flared portion of the lock washer, located at the inner surface of the lock washer. In use, parts of engagement portion 46 protrude into hole 42 and/or into hole 30. This can assist in the sealing function, describe below.

For attachment to the deck of a yacht, the winch assembly is placed so that the pre-located screws extend through corresponding holes 30 in the deck. A single operator can perform all the necessary steps to attach the winch to the deck. The operator goes below deck to attach a washer and nut (not shown) to each screw. The nut may be tightened by that operator without the need for the head 44 of the screw to be held by another operator. This is because the lock washer 38 holds the screw against rotational movement with respect to the base plate 34. Consequently, there is a significant reduction in the complexity of attaching a winch to a yacht deck.

The lock washer is formed of a resilient waterproof material such as hard rubber. A suitable material is polyurethane with a Shore A hardness of 90. As a guide, the material used in O-rings is suitable. As the nut is tightened, the lock washer is compressed between the lower surface of base plate 34 and upper surface of deck 32. The resilience of the lock washer material allows the formation of a seal between the lower surface of base plate 34 and upper surface of deck 32. Also, the compression of the lock washer tends to squeeze engagement portion 46 tighter against shaft 40 of the screw. This further improves the seal between the lock washer and the screw shaft.

As a back-up to the sealing function of the lock washer, gasket 47 is provided. This is a gasket face seal which is located between the lower surface of the base plate and the upper surface of the deck. Effectively, each fixing hole 30 is surrounded by the gasket material. Additionally or alternatively, known sealing compositions may be provided between the lower surface of the base plate and the upper surface of the deck.

Alternatively, the lock washer may be formed of a different material such as steel or plastic. Such lock washers are readily available. Such non-resilient lock washers will not usually provide adequate sealing and so the attachment of the winch will require sealing means such as a gasket or an application of a sealing composition.

The above embodiments have been described by way of example only. On reading this disclosure, modifications of these embodiments, further embodiments and modifications thereof will be apparent to the skilled person and as such are within the spirit and scope of the invention.

The invention claimed is:

1. An assembly of:
   a winch;
   one or more threaded fastening elements; and
   one or more retaining elements,
   wherein the winch is for attachment to a surface of a watercraft using said threaded fastening elements in combination with one or more cooperating elements threadable on said threaded fastening elements, and wherein the winch has one or more apertures, each said threaded fastening element being retained in a respective one of said apertures and being held against rotation with respect to the winch up to a threshold torque by a respective one of said retaining elements, thereby allowing rotation of said threaded fastening element at torques higher than the threshold torque, wherein at least an engagement portion of the retaining element is jammed between the threaded fastening element and the aperture in the winch, protruding into said aperture.

2. An assembly according to claim 1 wherein the watercraft to which the winch is to be attached is a sailboat.

3. An assembly according to claim 1 wherein said retaining element holds said fastening element with respect to the winch by frictional engagement with said fastening element and with said aperture.

4. An assembly according to claim 3 wherein said fastening element has a head and a shaft, said retaining element being located on said shaft, abutted at the opposite side of said aperture to said head, and wherein at least part of said shaft projects from said aperture.

5. An assembly according to claim 1 wherein said threaded fastening element is a screw.

6. An assembly according to claim 5 wherein said retaining element is a lock washer.

7. An assembly according to claim 1 wherein said retaining element substantially prevents translational movement of the fastening element along the axis of the hole in the winch.

8. An assembly according to claim 1 wherein the engagement portion provides additional securing of the fastening element with respect to the winch by being jammed between the fastening element and the aperture in the winch.

9. An assembly according to claim 1 where said winch is a windlass.

10. An assembly of a sailboat winch and one or more screws and one or more lock washers, wherein the sailboat winch is for attachment to a deck of a sailboat using said screws in combination with one or more nuts, and wherein the winch has one or more mounting apertures, each said screw being retained in a respective one of said apertures and being held against rotation with respect to the winch up to a threshold torque by a respective one of said lock washers, thereby allowing rotation of said screw at torques higher than the threshold torque, wherein at least an engagement portion of the lock washer is jammed between the screw and the aperture in the winch, protruding into said aperture.

11. A method of producing an assembly of:
a winch;
one or more threaded fastening elements; and
one or more retaining elements,
wherein the winch has one or more apertures,
the method including retaining each said threaded fastening element in a respective one of said apertures and holding said fastening elements against rotation with respect to the winch up to a threshold torque using a respective one of said retaining elements, wherein at least an engagement portion of the retaining element is jammed between the threaded fastening element and the aperture in the winch, protruding into said aperture.

12. A method according to claim 11 wherein the winch includes a removable cover, the threaded fastening elements being assembled with the winch by removing the cover, the method including the subsequent step of replacing the cover before the winch is attached to a watercraft.

13. A method according to claim 11 wherein the winch is a windlass.

14. An assembly of a sailboat windlass and one or more screws and one or more lock washers, wherein the sailboat windlass is for attachment to a deck of a sailboat using said screws in combination with one or more nuts, and wherein the windlass has one or more mounting apertures, each said screw being retained in a respective one of said apertures and being held against rotation with respect to the windlass up to a threshold torque by a respective one of said lock washers, thereby allowing rotation of said screw at torques higher than the threshold torque, wherein at least an engagement portion of the lock washer is jammed between the threaded fastening element and the aperture in the windlass, protruding into said aperture.

* * * * *